Nov. 14, 1961  W. A. HASBANY  3,008,489
ROTARY VALVE
Filed Dec. 30, 1959  2 Sheets-Sheet 2
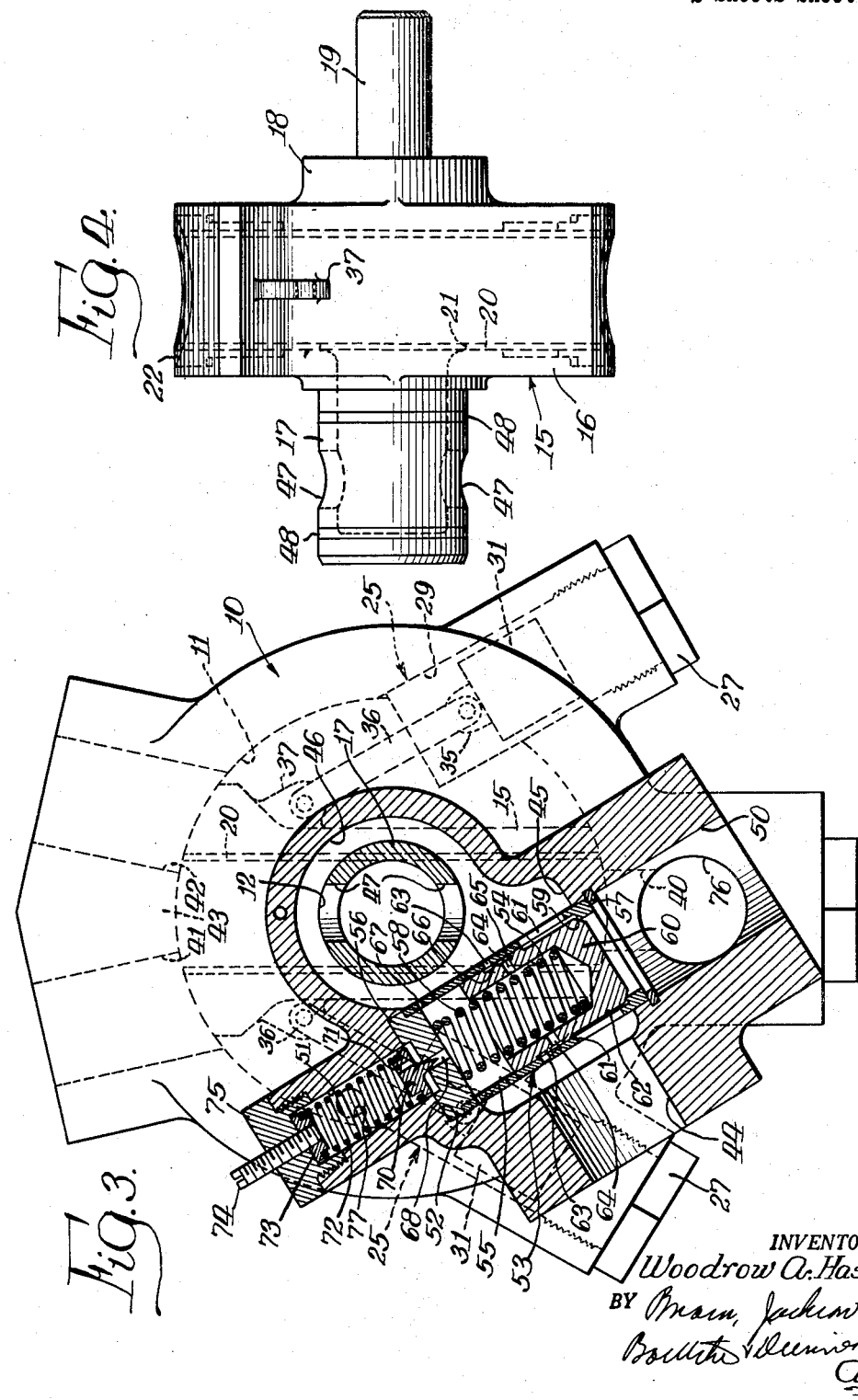
INVENTOR.
Woodrow A. Hasbany 3,008,489
ROTARY VALVE
Woodrow A. Hasbany, South Bend, Ind., assignor to Clark Equipment Company, a corporation of Michigan
Filed Dec. 30, 1959, Ser. No. 862,962
8 Claims. (Cl. 137—624)

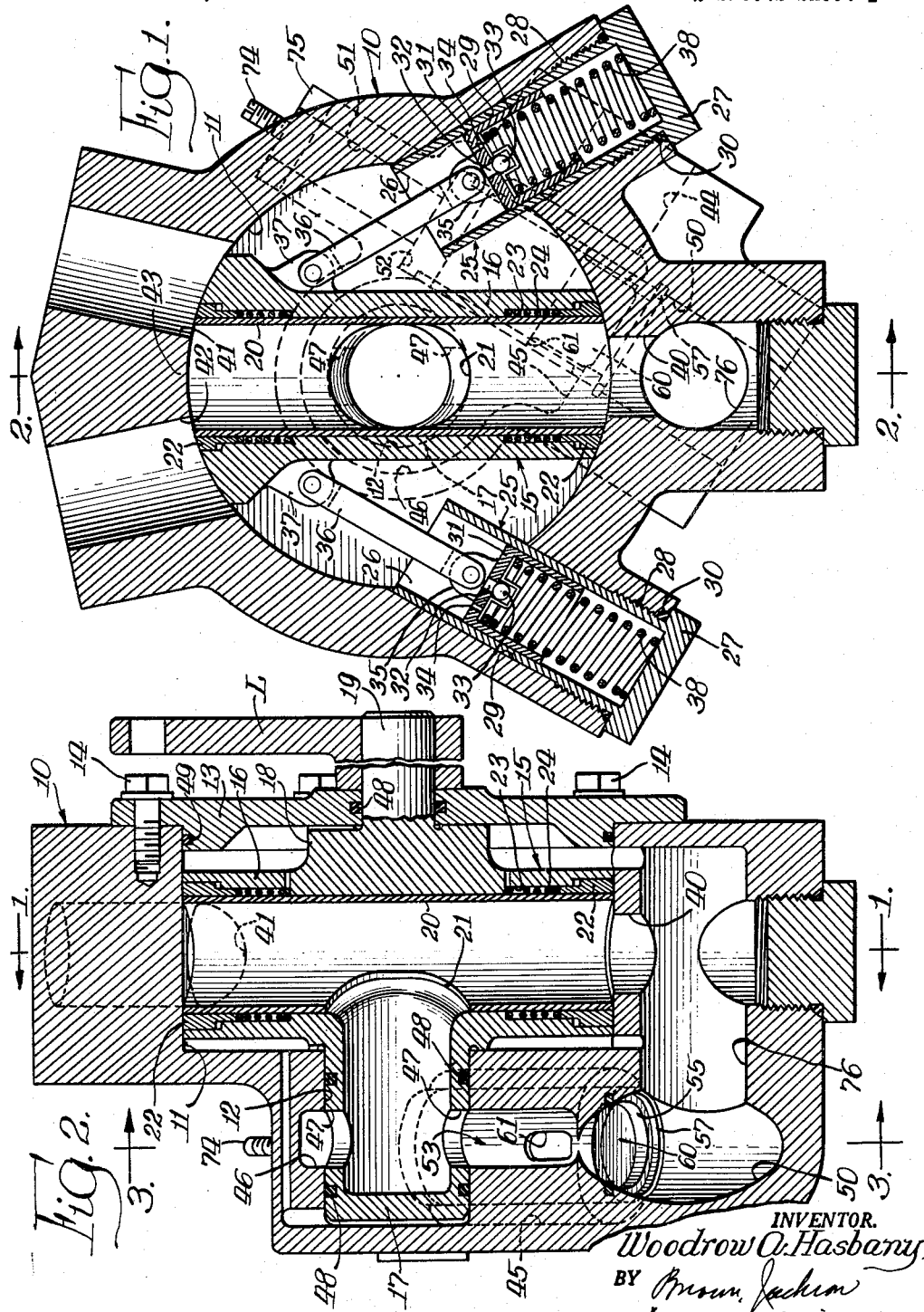

The present invention relates generally to a rotary valve, and more particularly to a rotary control valve for fluid-operated apparatus.

The valve of the present invention is an improvement on prior rotary valve constructions, incorporating means by which the flow therethrough may be progressively changed to effect a corresponding adjustment in the operation of the apparatus or equipment controlled by the valve. Such change in flow is effected smoothly, the valve incorporating structure which prevents sudden or jerky operation of the valve, so as to guard the controlled apparatus against hydraulic impact. The structure of the present valve provides for a neutral position thereof in which idling operation of the controlled apparatus or equipment is permitted, biasing means being employed to urge the valve member to this neutral position. The control valve of the invention also includes a relief valve which protects the valve and the hydraulic system in which it is connected against damage from excessive pressure, as well as controlling the maximum pressure in the valve and system. The valve member of the invention is hydraulically balanced, so that the application of load will not cause it to jump or slip out of the position to which it has been moved.

It is an object of the invention to provide a rotary control valve for apparatus operated by hydraulic or other fluid which provides for a smoothly progressive change in the flow through the valve.

Another object is the provision of a rotary type valve in which hydraulic impacts on the apparatus controlled by the valve are eliminated by restraint on movement of the valve.

Another object is the provision of a valve having a rotary valve member which is biased to a neutral position permitting idling operation of the apparatus controlled thereby, but is hydraulically balanced so that it will not be moved to the neutral position from an adjusted position by the bias therefo, or moved out of the adjusted position by the load applied through the valve.

A further object of the invention is the provision of a rotary control valve which incorporates a relief valve structure therein to regulate the maximum pressure, and prevent damage due to excessive pressure.

Other and further objects, advantages and features of the invention will be apparent to those skilled in the art from the following detailed description, taken in conjunction with the accompanying drawings, in which:

FIG. 1 is a sectional view through one embodiment of the valve of the invention, taken substantially as indicated by the line 1—1 of FIG. 2;

FIG. 2 is a sectional view taken substantially as indicated by the line 2—2 of FIG. 1;

FIG. 3 is a sectional view taken substantially as indicated by the line 3—3 of FIG. 2; and FIG. 4 is an elevational view of the rotary valve member.

The illustrated embodiment of the valve according to the present invention comprises a body generally designated 10 having a generally cylindrical chamber 11 therein from one end of which extends a cylindrical chamber portion 12 of smaller diameter and formed on the same axis. The other end of the chamber 11 opens through the face of the body, and is closed by a suitable cover plate 13 secured in place as by bolts 14.

A rotary valve member generally designated 15 is mounted for rotation in the chamber, extending diametrically thereof with its ends in contact with the cylindrical surface of the chamber 12. The valve member comprises a generally cylindrical shell 16 which at a central portion thereof has projecting radially outwardly a cylindrical portion 17 of a diameter such as to be journaled in the smaller chamber portion 12, and having a closed end. Formed on the same axis as the cylindrical portion 17 and diametrically opposite the same relative to the cylindrical shell 16 is a hub 18 from which a stub shaft 19 projects outwardly through a suitable opening in the cover plate 13. The member 15 is journaled by the shaft 19 and the cylindrical portion 17 serving as a trunnion to rotate in the chamber 11, and any suitable means may be employed for effecting such rotation, as for example a handle L as shown in FIGURE 2, secured to the shaft 19. Within the cylindrical shell 16 is disposed a sleeve 20 having a central aperture 21 affording communication with the interior of the radial projection 17. About each end of the sleeve 20 is disposed an annular sealing member 22 of any appropriate material, disposed within the adjacent end of the cylindrical valve member shell 16, the inner surface of which is suitably offset to accommodate the sealing member and to provide an annular recess 23 in which a suitable spring 24 is disposed, extending between the sleeve 20 and the annular recess surface and bearing on the edge of a flange portion of the sealing means extending into the recess 23 so as to urge the sealing annulus outwardly into close engagement with the cylindrical surface of the chamber 11, as will be obvious from FIGS. 1 and 2.

Rotation of the valve member 15 in the chamber 11 is limited, and the movement of the valve member is checked and cushioned, by a pair of restraining means each generally indicated as 25, and each comprising a cylinder 26 formed as a tubular member closed at one end by a hexagonal or other non-circular head 27 and threaded exteriorly as at 28 for securement in a suitable bore 29 extending through the valve body 10 and opening through the cylindrical surface of the chamber 11. An O-ring or other suitable seal 30 may be provided between the outer end of the bore and the cylinder 26. The axes of the cylinders 26 lie in the plane of rotation of the valve member 15 and intersect each other at an angle which is bisected by the axis of the valve member when it is located in a neutral position substantially midway between its extremes of rotational movement. In each of the cylinders 26 is disposed a piston 31, in this case shown as of the skirted type but which may be of any suitable form, which has a passage 32 therethrough controlled by check valve 33 of any suitable form, in this case shown as a ball suitably mounted for limited movement adjacent the inner end of the passage 32. The arrangement in this case is such that the ball is forced into closing engagement with the adjacent end of the passage 32 when the piston moves inwardly in the cylinder, and to be moved to passage-opening position when the piston moves outwardly. The piston also has a restricted orifice 34 extending therethrough which permits metered flow of hydraulic or other fluid from one side to the other of the piston. A lug 35 is provided on each of the pistons 31 for pivotal connection to one end of a link 36 the other end of which is pivotally connected to a lug 37 projecting from an enlarged end portion of the shell 16. In each of the cylinders 26 is a suitable helical compression spring 38 which acts between the bottom of the cylinder and the inner face of the piston to urge the piston outwardly, and which limits the inward movement of the piston as by going solid or being compressed to its maximum.

It will be apparent that rotation of the valve member 15 in one direction or the other is limited by the restraining means, and that in addition it is biased to the intermediate or neutral position by the action of the springs 38, which are equal and opposite in effect. It will also be understood that by reason of the restraining means 25, sudden or jerky movement of the valve member 15, is prevented, the rate of movement being limited to the maximum permitted by the rate of flow of fluid through the orifice 34 of that piston 31 which is being moved inwardly in the cylinder 26 by the rotation of the member 15, in the arrangement as shown. The system or apparatus controlled by the valve thus is protected against sudden hydraulic shocks or impacts, and possible damage or jerky operation is prevented. It should be noted that the valve is hydraulically balanced, so that upon application of load it will not jump or kick out of the position to which it has been moved.

A discharge port 40 is provided opening from the cylindrical surface of chamber 11 intermediate the cylinders 26, and a forward port 41 and a reverse port 42 are provided opening from the cylindrical surface of the valve chamber and extending out through the wall of the body 10 to provide for communication with fluid-operable apparatus to be controlled by the valve. The ports 41 and 42, the designation of which as forward and reverse is arbitrary, since either may be employed for connection to either the inlet or outlet of hydraulic mechanism or apparatus, are located generally diametrically opposite the discharge port 40, being separated by a land 43 which is directly opposite the discharge port. Each of the ports 41 and 42 is of a diameter substantially equal to that of the passage defined through the valve member 15 by the sleeve 20 and the land 43 is of less extent, in the common axial plane of the two ports 41 and 42 at the chamber surface, than the diameter of the valve member passage; thus, it cannot cut off communication between the valve member 15 and the ports 41 and 42 when the valve member is in a position with its axis passing through the discharge port and the land, or in other words when the valve member extends diametrically between the discharge port 40 and the land 43 and its adjacent ports 41 and 42. This is the neutral position of the valve member 15, shown in full lines in FIG. 1.

The body 10 is also provided with an inlet port 44 which is in communication at all times with the interior of the valve member 15. To this end, the port 44 opens from the exterior of the body to a passage 45 which has an annular portion defined by a groove 46 in the cylindrical surface of the reduced chamber portion 12. The groove 46 together with the adjacent portion of the passage 45 surrounds the radially projecting cylindrical portion 17 of the valve member 15, which has formed therein a plurality of apertures 47 which provide communication between the groove 46 and passage 45 and the interior of the cylindrical portion 17, and thence through the aperture 21 with the flow passage through the valve member. Suitable sealing rings 48 are provided to seal about the reduced cylindrical portion 17 of the valve member on opposite sides of the groove 46 to prevent leakage of fluid between the reduced chamber portion 12 and the cylindrical portion 17. A similar sealing ring 48 is also disposed about the shaft 19 in the cover plate 13 to prevent leakage of fluid from the valve body along the shaft. Similarly, an O-ring 49 or like sealing means is provided to seal between the chamber 11 and the adjacent portion of the cover plate 13, to prevent leakage about the edge of the plate.

A bore 50 is formed in the body 10 extending substantially at right angles to the inlet port 44 and intersecting therewith, the passage 45 communicating with the inlet port 44 comprising in effect an enlargement of the bore 50. The bore 50 has a reduced end portion 51 at the end relatively remote from the inlet port 44, the bore 50 in effect constituting a counterbore of the bore 51, a shoulder 52 being defined about the inner end of bore 51. A relief valve generally desginated 53, best shown in FIG. 3, is disposed in the bores 50 and 51, comprising a main valve body having a valve chamber 54 therein and provided by a sleeve 55 snugly fitting the bore 50 and extending between a separator plate 56 seated on the shoulder 52 and a retaining ring 57 engaged in a radial groove in the bore 50. The plate 56 provides a seat for one end of a compression spring 58 which holds in engagement on a valve seat 59 a cylindrical cup-like valve member 60 slidably disposed in the sleeve 55 and having the other end of the spring 58 engaged therein. The seat 59 is provided by a radially inwardly projecting portion of the sleeve adjacent the ring 57. The sleeve 55 has a plurality of relatively large apertures 61 formed therein adjacent the seat 59 providing communication between the passage 45, which substantially surrounds the valve body, and the bore 50 when the valve member 60 is unseated. The valve member is of reduced external diameter adjacent the closed or seat-engaging end thereof, as indicated at 62, this reduced portion providing an annular recess about the valve member in communication through the apertures 61 with the inlet passage 45, and thus being at the same fluid pressure as the inlet. A plurality of apertures 63 appreciably smaller than the apertures 61 also are provided in the sleeve 55, which are adapted to communicate, upon unseating of the valve member 60, with a similar number of radial apertures 64 of substantially the same diameter extending through the cylindrical wall of the valve member 60 and connected by a circumferential groove 65 in the exterior surface of the wall, so as to provide for communication between the chamber 54 and the inlet passage 45 when the valve member is in open position. Another circumferential groove 66 in the valve member wall longitudinally spaced from the groove 64 may be employed to connect the apertures 63 when the valve is closed. The grooves 65 and 66 provide balancing of the fluid forces acting of the valve member 60 at the associated apertures 63 and 64. A plurality of restricted bleed apertures 67 is provided in the sleeve 55 adjacent the separator plate 56 to afford communication at all times between the passage 45 and the valve chamber 54, so as to bring the pressure of fluid within the body to the same level as the pressure in the inlet. An axial passage 68 extends through the plate 56 and is normally closed by a pilot poppet valve member 70 disposed in the bore 51 and having a port or passage 71 extending between the opposite faces thereof. The cross-sectional area of passage 68 is considerably greater than the combined area of all the bleed apertures 67, in the present instance eight times as large. The pilot valve member 70 is suitably formed to be engaged by one end of a compression spring 72 the other end of which seats on a spring follower 73 secured on the inner end of an adjusting stem or screw 74 threaded axially through a suitable screw plug 75 threaded in the body to close the end of the bore 51. An appreciable clearance is provided between the member 70 and the interior of the bore 51.

The discharge port 40 communicates with a discharge passage 76 extending substantially at right angles to the bore 50 and intersecting therewith outwardly of the valve member 60 of the relief valve 53, as will be clear from FIGURES 1 and 2. An exhaust passage 77 leads from the bore 51 to the outlet bore 50 or otherwise to the exterior of the valve body 10.

With the valve member 15 in the neutral position, as shown in FIGURE 1, the inlet port 44 is connected to the flow passage of the valve member 15 in the manner already described, and through the valve member to the discharge port 40, which as already explained is in communication through the discharge passage 76 with the bore 50, which serves as an outlet from the valve. It will be appreciated that the inlet port 44 may be connected to a suitable source of fluid under pressure, such as the pressure side of a pump, and the outlet 50 may be connected to an exhaust or low pressure side of a hydraulic system, such as the suction side of a pump. The fluid entering the valve through the inlet port 44 thus passes through the discharge port 40 and outlet bore 50 to discharge or for recirculation. A portion of the fluid entering the valve may also pass through the valve member 15 out of either or both of the forward and reverse ports 41 and 42, to enter the inlet and/or outlet means of fluid-operable apparatus or equipment to which these ports may respectively be connected in any suitable manner. Primarily, however, the valve member in this position places the ports 41 and 42 in communication with each other so that fluid may circulate in either direction through the associated fluid-operable apparatus. It will also be apparent that fluid from such apparatus may flow through either or both of the ports 41 and 42 into the chamber 11 about the valve member 15, which has one end thereof extending across both ports 41 and 42 as already explained. From the chamber 11 the fluid may flow about the valve member 15 into the discharge passage 76 and thus out of the outlet 50. In this neutral position of the valve member, the apparatus controlled thereby is in a floating or idling condition, since no pressure is developed for operating the apparatus, the only build-up of pressure resulting from local and relatively minor restrictions in the flow path of the fluid.

Assuming the forward port 41 is connected to the inlet side of fluid-operable apparatus, as for example the forward drive port of a hydraulic motor or the inlet of a double-acting hydraulic cylinder, the apparatus may be operated in one direction by turning the shaft 19, as by means of the lever L, to bring the valve member passage at the enlarged end of the valve member 15 into registry with the port 41. The other end of the valve member traverses the discharge port 40 during this movement, and when the valve member is in full registration with the port 41, is disposed entirely clear of the discharge port 40, so that there is no communication between the ports 40 and 41. In this position, which represents one extreme of movement of the valve member, the fluid entering through the inlet port 44 flows through the valve member passage into the port 41 and thence to the inlet means of the apparatus, and returns through the outlet means of the apparatus to the reverse port 42, and thence through the chamber 11 about the valve member 15 through the discharge port 40 and passage 76 to the outlet bore 50 and thence to the low pressure portion of the system. It will be seen that with the discharge port 40 out of communication with the flow passage to the valve member 15, maximum fluid pressure and volume is applied to the fluid-operable apparatus or equipment, since all of the fluid entering the valve is delivered to such apparatus. It will also be apparent that if the valve member is rotated to a position communicating with the port 41 but shutting out the port 42, while remaining in communication with the discharge port 40, a greater or less proportion of the entering fluid will flow through the forward port 41 to the fluid-operable apparatus, the remainder passing through the discharge port 40, so that less than maximum operating pressure is effective or available for operating the apparatus, and thus the rate of operation is reduced, or the power output thereof is held below maximum. The proportional division of the entering fluid depends, of course, upon the particular position of the valve member 15 relative to the ports 40 and 41. As more and more of the port 41 is opened to the inflowing fluid, and more and more of the port 40 is closed, less and less of the fluid passes through the discharge port and more and more flows through the apparatus. In this connection, it may be noted that, as will be evident from FIGURE 1, the valve member 15 may be rotated to a position entirely out of communication with the reverse port 42 and partially or not in full communication with the forward port 41, but with the other end still in communication with the entire area of the port 40, which is smaller than the ports 41 and 42.

The operation of the valve is similar if the valve member 15 is rotated to its other extreme position, in full communication at the enlarged end with the reverse port 42 and with its other end entirely out of communication with the discharge port 40. In this case, the flow through the inlet port 44 passes entirely through the reverse port 42 to enter the outlet means of the apparatus and effect reverse operation thereof, the fluid returning through the forward port 41 to pass through the chamber 11 into the discharge passage 76 and so out through the outlet bore 50. Control of the operation in this reverse manner is the same as in the case of the forward operation already described in connection with the positioning of the valve member 15 relative to the forward port 41 and discharge port 40.

It should be noted that the enlargement of the end of valve member 15 disposed adjacent ports 41 and 42 not only limits flow about the valve member in the neutral position, but assures smooth movement of the valve member over these ports 41 and 42 and the land 43 therebetween. The enlarged end also, obviously, facilitates the provision of the ears 37 on the valve member. "Feathering" action of the valve or opening of one port to another in a smooth manner results from the relative movement over each other of circular ports or openings, as will be apparent.

It will be apparent that in movement of the valve member 15 in either direction, a sudden or sharp, jumpy, or jerky operation thereof is prevented by the provision of the restraining means 25, that one of the means 25 in which the spring 38 is compressed and the piston 31 moved inwardly allowing the rotation of the valve member only at the rate permitted by flow of fluid outwardly through the restricted orifice 34 of the piston, cushioning and smoothing out the movements. At the same time, the other restraining means 25, by reason of the fact that the check valve 33 is open as the piston 31 thereof is moved outwardly by the link 36 and thus permits substantially unrestricted flow of fluid through the passage 32 from one side to the other of the piston, moves freely and with substantially no resistance to the rotation of the valve member. Outward movement of the piston, of course, is assisted by the action of the compression spring 38. The spring 38 in the case of the piston 31 which is moved inwardly of its cylinder 26 on rotation of the valve member, of course, opposes such movement of the piston, and thus assists the restricted orifice 34 in retarding movement of the valve member. The spring 38 is of such dimensions relative to the piston 31 and cylinder 26 that it will stop inward movement of the piston 31, as by going solid, substantially as the valve member 15 comes into full registry or communication with the selected port 41 or 42, and thus determines the limit or extreme of rotational movement of the valve member in the one direction, while the arrangement of the other restraining means 25 determines such limit in the opposite direction. It will be seen that the restraining means 25 not only limits the movement of the valve member 15, but safeguards the apparatus or system associated with the valve against sudden hydraulic shocks and impacts which might cause damage or failure, by preventing the too rapid or sudden change in flow through the valve, in limiting the speed of valve member movement.

The relief valve 53 is provided as a safeguard against the development of pressure in the valve or in the associated apparatus or system above a predetermined maximum pressure and its operation may be explained briefly as follows:

Fluid in the valve chamber 54, filling the same, is at the same pressure as fluid flowing through the inlet 44, by reason of the apertures 67. This pressure may be taken as the system pressure, since the outlet pressure may be ignored. This pressure, along with the force of spring 58, acts on the cross-sectional area of the valve member 60 to hold it engaged on the seat 59. The same pressure also acts through the apertures 61 on the much smaller area presented by the recess 62, in opposition to the valve seating or closing force, and thus tends to unseat the valve member 60. The inlet or system pressure also acts on the pilot poppet valve member 70, which is held closed by the force of spring 72. This spring force or pressure is adjusted by means of the screw 74 which positions the follower 73 for greater or lesser compression of the spring. The cross-sectional area of the passage 68 is relatively small, although considerably greater than that of the apertures 67, and accordingly a relatively low spring pressure is sufficient to hold the valve member 70 seated against the maximum system pressure allowed by the relief valve 53. For example, a force of less than 25 pounds is sufficient to hold the valve member 70 seated against a fluid pressure of 2000 p.s.i. in the chamber 54 when the passage 68 is a ⅛" diameter. So long as the inlet pressure does not exceed the maximum allowed by the setting of the spring 72, the relief poppet valve member 60 is maintained in its seated or closed position. As soon as the system pressure rises above the set value, however, the pilot poppet valve member 70 is opened against the force of spring 72, allowing the fluid to flow from valve chamber 54 through passage 68 into bore 51 and out through passage 77, the fluid flowing through the clearance space about valve member 70 and through passage 71 if the valve member is not forced to a position beyond the exhaust passage 77. This causes a very rapid, almost instantaneous, drop in pressure in chamber 54, since the fluid can flow out of the chamber through passage 68 at a rate several times faster than that at which it can flow in through the restricted apertures 67. This drop in pressure brings the total force of the fluid and spring 58, acting to hold valve member 60 seated, to a value less than that of the force acting to unseat the valve, that is, the inlet pressure acting on the area presented by the annular recess 62. The valve member 60 is therefore forced from the seat 59, allowing fluid from the inlet 44 to flow through the apertures 61 and seat 59 to the outlet bore 50 and thence to the exhaust or low pressure side of the system.

When the excess pressure has thus been purged, the pilot poppet valve member 70 is reseated by spring 73, permitting the chamber 54 to be refilled with fluid which then again acts to hold the valve member 60 seated and the valve 53 closed, the spring 58 initially reseating the valve member 60 before complete filling of the chamber with fluid. Since such refilling would be a relatively slow process if it were accomplished only through the apertures 67, the apertures 63 and 64 are provided. In the unseated condition of the valve member 60, the apertures 64 in the valve member are positioned in communication with the apertures 63 of the sleeve 55, so that fluid can flow from the inlet 44 into chamber 54 in much greater volume that through the apertures 67 alone. The valve 53 is thus closed very quickly after restoration of the inlet or system pressure to below the set value, and undesirable lag in bringing the system fully back to the desired condition is eliminated. The relief valve is thus rendered very sensitive to pressure changes and capable of responding quickly to excessive pressure conditions so as to eliminate surges.

Of course, although the relief valve 53 is considered very advantageous in its operation and the efficient results it provides some other suitable relief valve might be employed instead, if desired. It will also be apparent that the particular arrangement and location of the relief valve might be other than as shown, if the particular apparatus or system with or in which the rotary valve of this invention were employed made such a change advantageous. It will be understood that the disclosed embodiment of the invention is exemplary and illustrative of the invention, and that many changes and modifications may be made without departure from the scope and spirit of the invention, which is not to be limited except as required by the appended claims.

I claim:
1. A forward and reverse control valve for fluid-operable apparatus, comprising a body having a generally cylindrical chamber therein, a discharge port opening from the cylindrical surface of said chamber, a forward port and a reverse port opening from said chamber surface in closely spaced relation to each other and in generally diametrically opposed relation to said discharge port, a rotary valve member extending diametrically in said chamber having a flow passage therethrough opening through the opposite ends thereof, means effecting a seal between said chamber surface and each end of said valve member about the passage opening, said valve member having a neutral position with one end of said flow passage fully registering with said discharge port and the other end communicating with both said forward and reverse ports for communication therebetween and said forward and reverse ports communicating with said chamber about the valve member, means for rotating the valve member in one direction from said neutral position to a forward flow position with said one end out of register with the discharge port and said other end in full registration with the forward port and with the reverse port in communication with the valve chamber and also in the opposite direction to a reverse flow position with said one end out of registration with the discharge port and the other end in registration with the reverse port and with the forward port in communication with the valve chamber, an inlet port, means placing said inlet port in communication with the flow passage of the valve member at all times for checking movement of the valve member and limiting rotation thereof to movement between said forward and reverse flow positions including a pair of restraining means extending into the valve chamber in opposed relation to each other with the valve member therebetween, each restraining means having a cylinder, a piston reciprocable in the cylinder, a link connecting the piston and valve member, a check valve in the piston, a restricted orifice through the piston, and means biasing the piston to movement in a direction opening the check valve thereof, whereby the opposed restraining means bias the valve member to said neutral position.

2. A control valve for fluid-operable apparatus, comprising a body having a generally cylindrical chamber therein, a discharge port opening from the cylindrical surface of said chamber, a forward port and a reverse port opening from said chamber surface in closely spaced relation to each other and in generally diametrically opposed relation to said discharge port, a rotary valve member extending diametrically in said chamber having a flow passage therethrough opening through the opposite ends thereof, means effecting a seal between said chamber surface and each end of said valve member about the passage opening, said valve member having a neutral position connecting said discharge port with both said forward and reverse ports and while allowing communication of said forward and reverse ports communicating with said chamber about the valve member, means for rotating the valve member in one direction from said neutral position to a forward flow position with said one end out of register with the discharge port and said other end in full registration with the forward port and also in the opposite direction to a reverse flow position with said one end out of registration with the discharge port and the other end in registration with the reverse port, an inlet port, means placing said inlet port in communication with the flow passage of the valve member at all times, a relief valve in said body subject to fluid pressure in the control valve, and means limiting rotation of the valve member to movement between said forward and reverse flow positions and cushioning said movement including a pair of restraining means extending into the valve chamber in opposed relation to each other with the valve member therebetween, each restraining means having a cylinder, a piston reciprocable in the cylinder, a link connecting the piston and valve member, a check valve in the piston, a restricted orifice through the piston, and means biasing the piston to movement in a direction opening the check valve thereof, whereby the opposed restraining means bias the valve member to said neutral position.

3. A control valve for fluid-operable apparatus, comprising a valve body having therein a chamber partially defined by a cylindrical surface, a forward flow port and a reverse flow port opening adjacent each other from said chamber through said surface, a land defined between and separating said ports, a rotary valve member extending diametrically of said surface having extending longitudinally thereof a flow passage of a diameter greater than the width of said land, means mounting said valve member for rotation between one extreme position with one end communicating with one of said ports and another extreme position with said one end communicating with the other port, a discharge port opening from the chamber through said surface located for traverse by the other end of the valve member in movement thereof from one of said positions to the other, an inlet port, means maintaining said inlet port in communication with the valve member flow passage, and means biasing the valve member to a neutral position with said other end communicating with the discharge port and said one end in communication with both the forward and reverse flow ports and the forward and reverse ports also communicating with the valve chamber about the valve member, said biasing means also halting rotation of the valve member at said extreme positions.

4. A control valve for fluid-operable apparatus, comprising a valve body having therein a chamber partially defined by a cylindrical surface, a forward flow port and a reverse flow port opening adjacent each other from said chamber through said surface, a rotary valve member extending diametrically of said surface having a flow passage extending longitudinally thereof, means mounting said valve member for rotation between a position with one end communicating with one of said ports and a position with said one end communicating with the other port, a discharge port opening from the chamber through said surface located for traverse by the other end of the valve member in movement thereof from one of said positions to the other, an inlet port, means maintaining said inlet port in communication with the valve member flow passage, and means biasing the valve member to a neutral position with said other end communicating with the discharge port and said one end in communication with both the forward and reverse flow ports and the forward and reverse ports also communicating with the valve chamber about the valve member.

5. A bidirectional flow control valve comprising a body having therein a chamber partially defined by a cylindrical surface, a valve member limitedly rotatable in said chamber having ends sealingly engaging said surface and a flow passage therethrough opening through said ends, spaced ports opening from the chamber through said surface registrable with the flow passage openings, and means for restraining rotational movement of the valve member including a pair of cylinders projecting into the chamber with the valve member therebetween and having the axes thereof lying in the plane of said movement and intersecting each other, a piston reciprocable in each cylinder, a check valve in each piston, a restricted orifice in each piston, a link connecting each piston to the valve member in opposed relation to the other piston, and means limiting rotation of the valve member in both directions biasing each piston toward projected position to urge the valve member to a neutral position intermediate its extreme rotated positions.

6. A bidirectional flow control valve comprising a body having therein a chamber partially defined by a cylindrical surface, a valve member limitedly rotatable in said chamber having ends engaging said surface and a flow passage therethrough opening through said ends, spaced ports opening from the chamber through said surface registrable with the flow passage openings, and means for restraining rotational movement of the valve member including a pair of cylinders projecting into the chamber with the valve member therebetween and having the axes thereof lying in the plane of said movement and intersecting each other, a piston reciprocable in each cylinder, a check valve in each piston, a restricted orifice in each piston, and a link connecting each piston to the valve member in opposed relation to the other piston.

7. A control valve for fluid-operable apparatus comprising a body having a valve chamber therein, forward and reverse ports opening from said chamber, a discharge port opening from the chamber, a rotary valve member in the chamber rotatable between a forward flow position communicating with said forward port and out of communication with said discharge port and a reverse flow position communicating with said reverse port and out of communication with the discharge port, an inlet port, means maintaining the inlet port in communication with the valve member, and means restraining movement of the valve member including a cylinder, a piston in the cylinder, link means connecting said piston and valve member, a check valve in the piston, a restricted orifice through the piston, and means biasing the piston to move the valve member to a neutral position intermediate said forward and reverse flow positions.

8. A control valve for fluid-operable apparatus comprising a body having a valve chamber therein, forward and reverse ports opening from said chamber, a discharge port opening from the chamber, a rotary valve member in the chamber rotatable between a forward flow position communicating with said forward port and out of communication with said discharge port and a reverse flow position communicating with said reverse port and out of communication with the discharge port, said valve member also being rotatable to an intermediate position in communication with said discharge port and placing said forward and reverse ports in communication with each other, an inlet port, means maintaining the inlet port in communication with the valve member, and means restraining movement of the valve member including a cylinder, a piston in the cylinder, link means connecting said piston and the valve member, a check valve in the piston, a restricted orifice through the piston, and means biasing the piston to move the valve member to a neutral position intermediate said forward and reverse flow positions.

References Cited in the file of this patent
UNITED STATES PATENTS

| | | |
|---|---|---|
| 2,115,950 | Gurries et al. | May 3, 1938 |
| 2,360,987 | Temple | Oct. 24, 1944 |
| 2,777,426 | Steele | Jan. 15, 1957 |